J. B. AUSTIN.
PAPER CUTTING DEVICE.
APPLICATION FILED JAN. 7, 1921.

1,434,475.

Patented Nov. 7, 1922.
4 SHEETS—SHEET 1.

WITNESSES

INVENTOR
James B. Austin

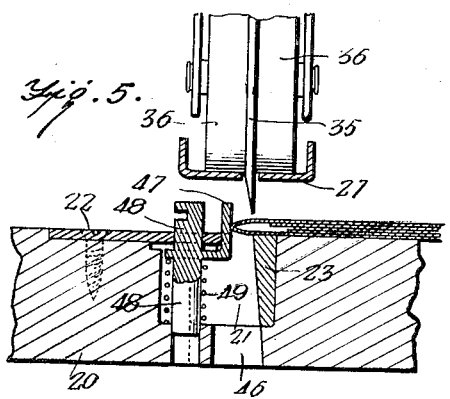
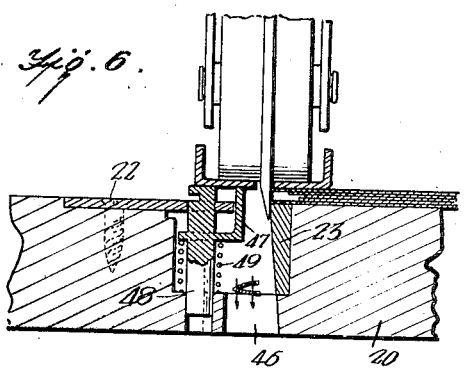
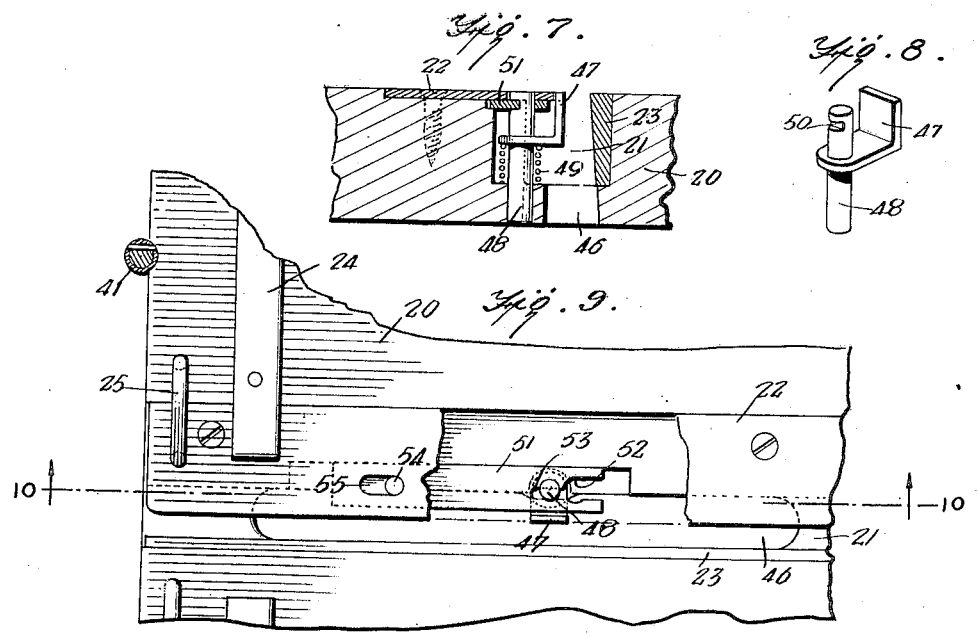
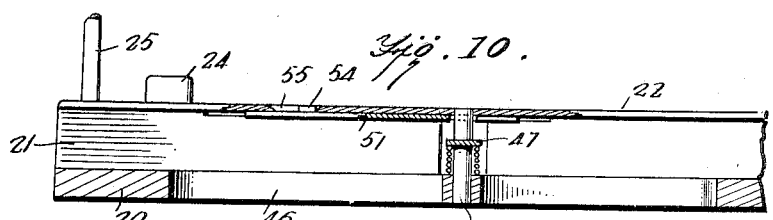
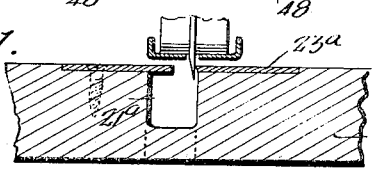

J. B. AUSTIN.
PAPER CUTTING DEVICE.
APPLICATION FILED JAN. 7, 1921.
1,434,475.
Patented Nov. 7, 1922.
4 SHEETS—SHEET 4.
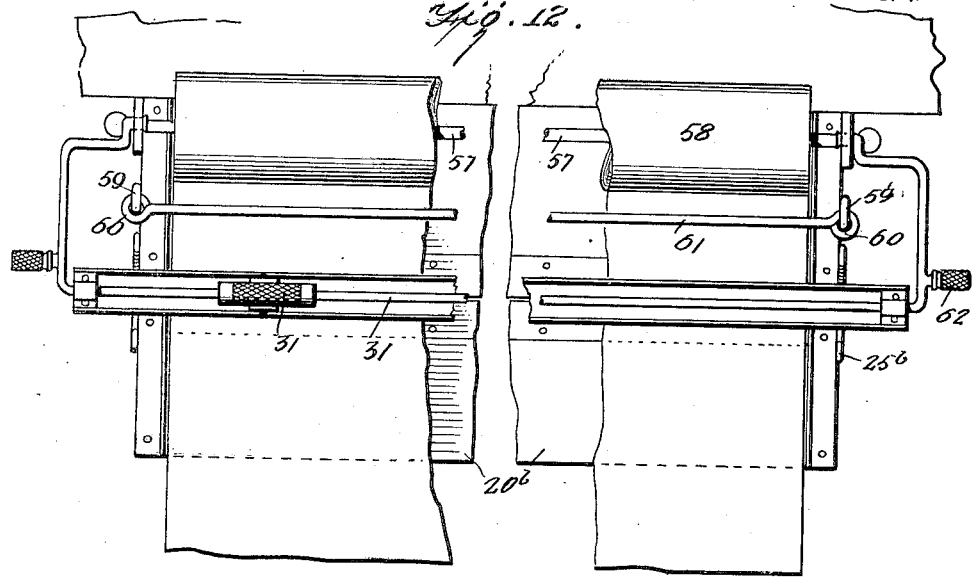
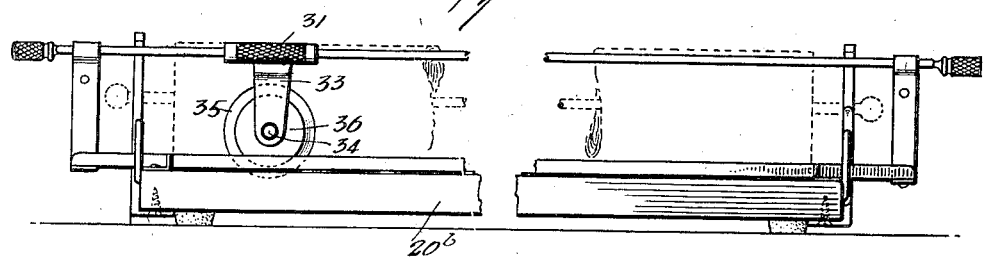
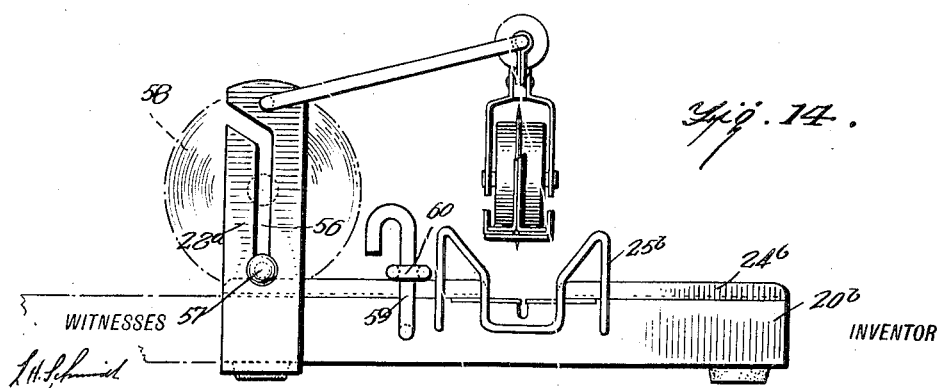
WITNESSES
INVENTOR
James B. Austin Patented Nov. 7, 1922.

1,434,475

UNITED STATES PATENT OFFICE.

JAMES B. AUSTIN, OF DOLGEVILLE, NEW YORK.

PAPER-CUTTING DEVICE.

Application filed January 7, 1921. Serial No. 435,650.

*To all whom it may concern:*

Be it known that I, JAMES B. AUSTIN, a citizen of the United States, and a resident of Dolgeville, in the county of Herkimer and State of New York, have invented certain new and useful Improvements in Paper-Cutting Devices, of which the following is a specification.

My present invention relates generally to paper cutting devices, and more particularly to a device for cutting wall paper, envelopes, trimming photographic prints, and other uses of this nature involving either clean or rough cuts, my object being the provision of a conveniently operable quick acting device, which may be applied to various particular purposes, and which is simple, strong and durable.

Figure 1:
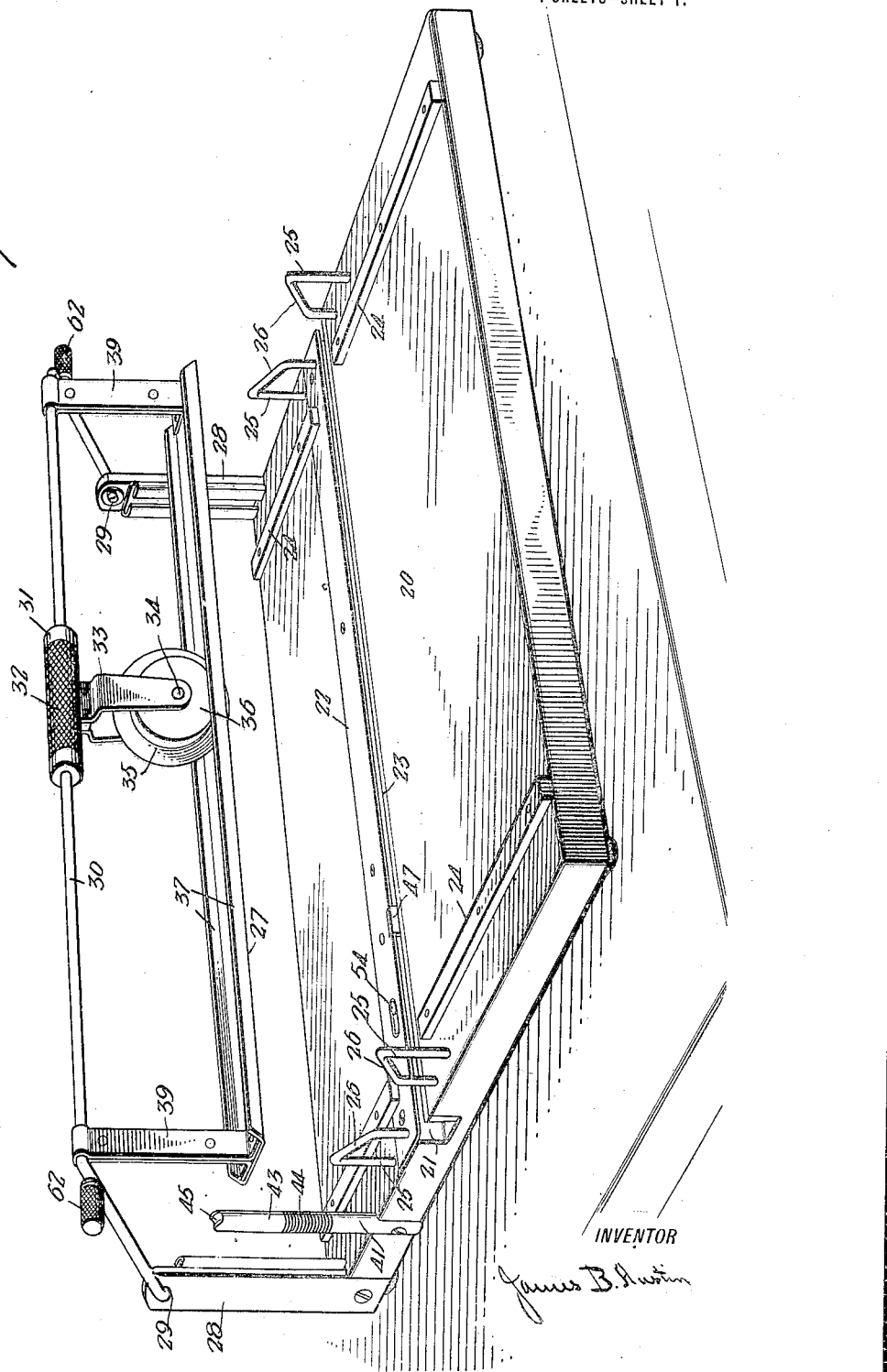
Figure 2:
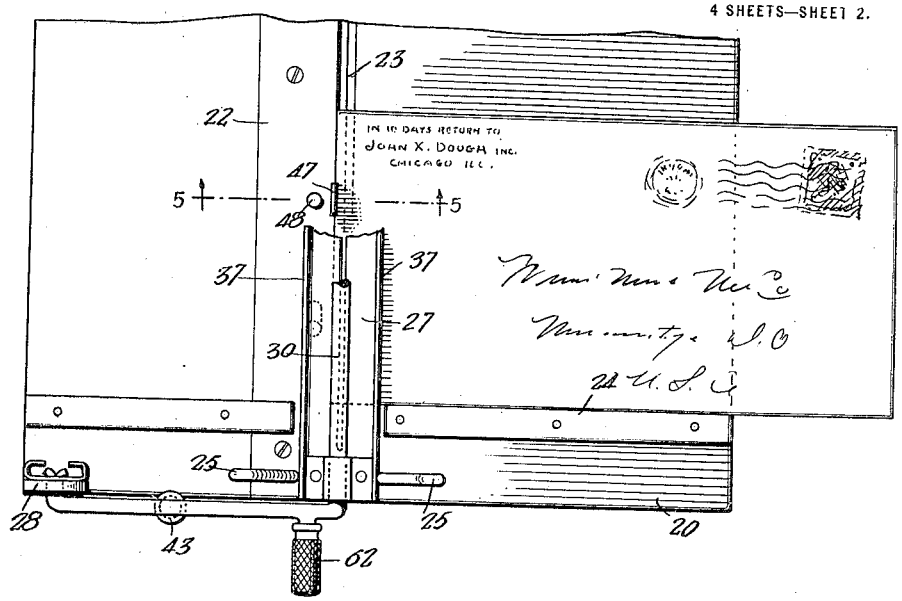
Figure 3:
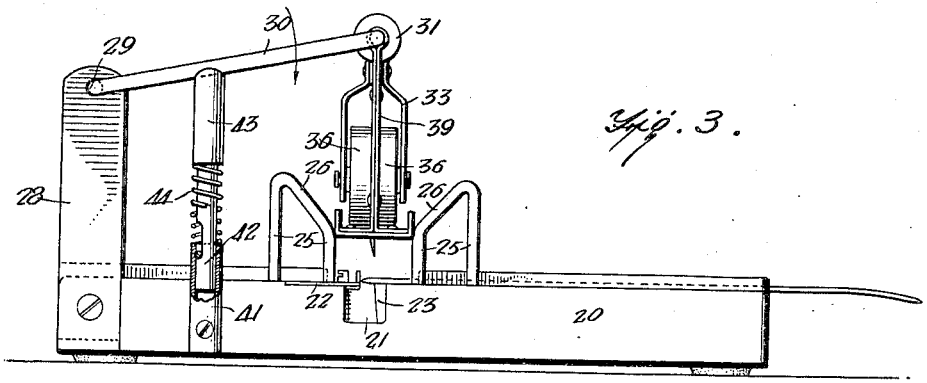
Figure 4:
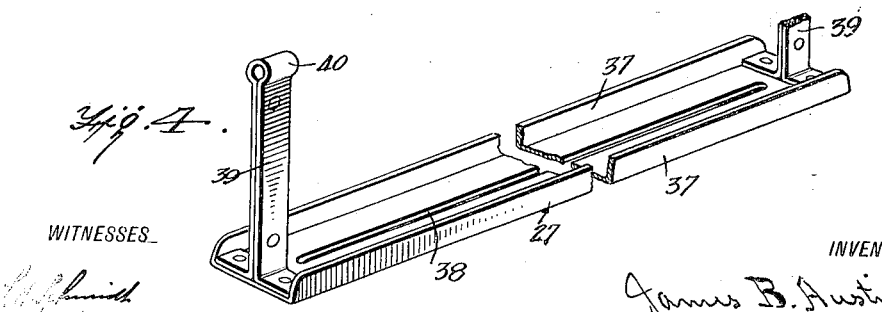

With these general objects in mind, other and more detailed objects as well as the resulting advantages of my invention will be better understood from the following description, reference being made to the accompanying drawings, which form a part of this specification, and in which Figure 1 is a perspective view of my improved device as a whole, Figure 2 is a top plan view of one end thereof, Figure 3 is an end elevation, Figure 4 is a detail perspective view partly broken away and in section, of the cutter guide and presser bar, Figures 5 and 6 are sectional views taken on the line 5—5 of Figure 2, Figure 5 showing the cutter elevated, and Figure 6 showing the cutter lowered in action, Figure 7 is a detail sectional view showing the stop member locked in inactive position, Figure 8 is a detail perspective view of the stop member removed, Figure 9 is a partial plan view of the cutter board, certain parts being broken away to better illustrate the locking means for the stop member, Figure 10 is a section taken on the line 10—10 of Figure 9, Figure 11 is a sectional view illustrating a slightly modified form, Figure 12 is a plan view of a modified form of the device adapting the same to the cutting of wall paper, Figures 13 and 14 are respectively, a side view and an end view of the form of invention shown in Figure 12.

Figure 15 is a perspective view illustrating use of the modified form of the invention in connection with wall paperers' boards.

Figures 16 and 17 are detail sections taken respectively on lines 16—16 and 17—17 of Figure 15.

Referring now to Figures 1 to 10 in particular, my invention proposes an apparatus including a horizontal cutter board 20 which may be disposed upon any suitable flat supporting surface and which is provided with a transverse groove 21 along one side of which is a counter-sunk rail 22, and within the opposite side of which groove is secured a cutter bar 23, the latter having one bevelled side face as seen particularly in Figures 5, 6 and 7 in order to effectively cooperate with the cutter as hereinafter described.

Extending upon the surface of the board 20 upon opposite sides of the groove 21, and at right angles to the edge of the cutter bar 23, are guide strips 24 against which the work is disposed in order that the cut made along the cutter bar will be at right angles to at least one edge of the work.

The board 20 is also provided with longitudinally spaced upstanding guide members 25 positioned upon relatively opposite sides and at relatively opposite ends of the groove 21, each of these guide members having an upper bevelled or inclined portion 26 so as to effectively guide the presser bar 27 downwardly between the guide members and flatwise over the groove 21 and into engagement with the work in order to clamp the latter downwardly against the upper edge of the cutter bar 23.

At its rear portion and adjacent to its opposite ends, the board 20 has uprights 28 in the upper ends of which are journaled the angular extremities 29 of a U-frame 30, the angular side portions of which are of such length as to bring its forward cross bar parallel with and above the groove 21 in one position. This U-frame is of rod-like nature adapting its forward cross bar to slidably receive the axially bored cutter slide 31 which is preferably provided with a milled surface 32 and which has a depending fork 33 supporting the axle pin 34 of the cutter wheel. This wheel is made up of a cutter disk 35 whose cutting edge is preferably bevelled in one direction only as seen in Figures 5 and 6, held between smaller disks or rollers 36, the latter of which track upon the upper surface of the presser bar 27, between its side flanges 37, when the edge of the cutter 35 extends downwardly through the lengthwise slot 38 of the presser bar.

Adjacent to its opposite ends the presser bar 27 has upright arms 39, each of which has a tubular upper end 40 loosely surrounding the cross bar of the U-frame above mentioned, adjacent to its opposite ends, so that the presser bar and the cutter guided thereby, can swing laterally with respect to the supporting U-frame in its movement downwardly between the guides 25 and to the work.

In order to normally hold the cutter supporting frame in elevated position, the cutter board 20 has at its opposite ends and spaced forwardly from the uprights 28, a pair of vertical tubular bearings 41 which receive lower reduced portions 42 of spring controlled upright posts 43, the controlling springs 44 of which tend to yieldingly hold the same in upper position with their upper transversely recessed ends 45 in supporting engagement with the angular side portions of the swinging supporting frame 30 as seen in Figure 3 in particular.

As seen in Figures 5, 6 and 7, the cutter board 20 may have a slotted opening 46 through the base of its groove 21 in order to provide for the discharge of severed portions of the work as seen particularly in Figure 6, in the cutting of which the handle or slide 31 of the cutter is grasped and the U-frame pressed downwardly so as to shift the presser bar 27 between the guides 25 and downwardly into engagement with the work as in Figure 6. The cutter is then operated by simply shifting the slide 31 along the forward cross bar of its supporting U-frame, the cutting disk 35 being rotated by virtue of the tractive engagement of its rollers 36 with the upper surface of the slotted presser bar. During operation it is preferable at the same time that the cutter be pressed with slight pressure toward the front, so that its cutting edge will be maintained in close even engagement with the cutter bar 23 particularly in connection with work where it is essential that a clean even and uniform cut be made, as in connection with the severing of the ends of envelopes, the trimming of photographic prints and the like.

In order to permit of quickly placing envelopes and like devices where but a very narrow portion is to be cut or removed, I provide a stop member 47, which is set into a portion of the inner edge of the rail 22 adjacent to one end of the cutter board, and which is movable vertically into and out of effective position. This stop member 47 is in the form of an angular stop-piece, the upright portion of which is movable above and below the rail 22, and the lower angular portion of which is secured to a guide post 48 journaled vertically in the cutter board and normally held in upper active position shown in Figure 5, by virtue of a spring 49. The upper portion of this post 48 has a side groove 50, and a slide 51 is shiftable along the lower surface of the rail 22 as seen in Figure 9, one slotted end 52 of which receives the upper portion of the post 49 and has a reduced inner slot 54, one edge of which is engageable with the side groove 50 to lock the post 48 in lowermost position. For this purpose, the slide 51 is movable lengthwise and has a stud 54 adjacent to its opposite end movable in a slot 55 of the rail 52, so that the locking slide may be conveniently shifted by hand in order to lock and release the stop member 47, depending upon the particular work.

Thus in operation in connection with the severing of the ends of envelopes, the stud 54 will be shifted to move slide 51 to released position, and the post 48 will be instantly elevated by the spring 49 to the operative position shown in Figure 5. An envelope is then placed upon the forward portion of the cutter board 20 with one edge against the adjacent guide strip 24 and one end against the stop member 47, and the cutter is then lowered and manipulated as previously described, from the position shown in Figure 5 to the position shown in Figure 6. The guide member 47 and its post 48 will be of course free to yield in a downward direction in advance of the presser bar 27. By moving the cutter along the presser and guide bar and at the same time shifting the same slightly in a forward direction, a clean even cut can be effected, and this is true of its operation upon various materials other than paper, whose nature is such that they can be cut by a hand operated rotating cutter of the character described.

As seen in Figure 11, the cutter bar 23$^a$ may be countersunk in the upper surface of the board 20$^a$ with a bevelled edge overlying one side of the groove 21$^a$, instead of securing a bevelled sided narrow bar within the groove as previously described and shown particularly in Figures 5, 6 and 7.

As seen in Figures 12, 13 and 14, my invention as to the cutting features, may be readily adapted to the severing of lengths of paper and like materials from rolls, the rear uprights 28$^a$ being utilized as roll supports and being for this purpose provided with angular slots or kerfs 56 adapted to receive the ends of a rod 57 passed through a roll 58. The cutter board 20$^b$ will in this case have side guide strips 24$^b$ and, at the rear of its guides 25$^b$ and between these guides and the uprights 28$^a$, there will be upstanding hooks or pins 59 loosely receiving eyes 60 at the opposite ends of a transverse presser rod 61, the latter of which is free to receive beneath the same, and bear upon the web from the roll 58, so that by its weight, it will hold the web flatwise upon the upper surface of the cutter board as the web is drawn forwardly beneath the cutter and its presser and guide bar.

The last described construction is particularly useful in connection with the severing of lengths of wall paper and the like, in connection with which it may not be necessary to bevel the cutter in only one direction and provide for its movement along and closely against the cutter bar as the work does not usually require as clean, even and uniform cut such as is required in the severing of envelopes and the trimming of photographic prints.

It is obvious from the foregoing that my invention provides a readily operated cutting arrangement adaptable to various materials and various purposes, as well as one which is simple, strong and durable, and is capable of effective use with minimum skill, and but little care in its manipulation.

It is to be observed that the U-shaped supporting frame in connection with which the cutter is slidable in each of the constructions shown and described, may be shifted on its pivotal connections with the uprights of the cutter board, vertically and to the rear of these uprights in case it becomes necessary or desirable to do so, and for the purpose of readily manipulating this frame, its angular side portions may have small milled handles 62 extending therefrom as shown in Figures 1, 2, 12 and 13.

I claim:—

1. A cutting apparatus of the character described comprising a cutter board having a groove and provided with upstanding guides at opposite sides of the groove adjacent to its opposite ends, a cutter bar along one side of the groove, a frame pivoted to swing in connection with the cutter board and having a cross rod adapted to aline above the groove, a slotted presser bar movably suspended in connection with said frame, a cutter wheel including a disk movable in the slot of the presser bar and side rollers arranged to track on the presser bar and a support for the cutter wheel in the nature of a slide movable along a portion of the frame parallel to the presser bar, as described.

2. A cutting apparatus including a cutter board having a groove and a beveled cutter bar within and along one inner side of the groove, guides upstanding at opposite sides of the groove, a swinging frame having a portion shiftable above the groove, a presser bar swingingly mounted in connection with the frame for vertical movement between the said guides and adapted to have in connection and co-operation therewith a cutter wheel including a cutting disk and side rollers having tractive movement on the presser bar and provided with a support loosely mounted to slide on a portion of the said frame.

3. A cutting apparatus including a cutter board having a groove and a beveled cutter bar within and along one inner side of the groove, guides upstanding at opposite sides of the groove, a swinging frame having a portion shiftable above the groove and having small milled handles for the convenient shifting of the same, a presser bar swingingly mounted in connection with the frame for vertical movement between the said guides and adapted to have in connection and co-operation therewith a cutter wheel including a cutting disk and side rollers having tractive movement on the presser bar and provided with a support loosely mounted to slide on a portion of the said frame, means to normally hold the cutter supporting frame in elevated position above the cutter board, as described.

4. A cutting apparatus comprising a cutter board having a groove and provided with uprights, a U-frame pivotally supported by the uprights and including a cross rod shiftable above the groove of the cutter board, a slotted presser bar loosely suspended from the cross bar, and a cutter slidable on the cross bar including a rotating wheel having tractive engagement with the presser bar and provided with a cutting disk extending through the slot of the presser bar, and arranged to co-operate with the beveled cutter bar within the groove of the cutter board, said cutter board having upstanding guides at opposite sides of its groove and between which the presser bar is shiftable into and out of engagement with the cutter board, as described.

5. A cutting apparatus comprising a cutter board having a groove and provided with uprights, a U-frame pivotally supported by the uprights and including a cross rod shiftable above the groove of the cutter board, a slotted presser bar loosely suspended from the cross bar, and a cutter slidable on the cross bar, including a rotating wheel having tractive engagement with the presser bar and provided with a cutting disk extending through the slot of the presser bar and vertically yielding means carried by the cutter board to normally hold the U-frame in elevated position above the cutter board.

JAMES B. AUSTIN.

Witnesses:
ALBURNE M. VAN DENBURG,
W. J. LEVIS.